United States Patent [19]
Ellis

[11] Patent Number: 5,358,607
[45] Date of Patent: Oct. 25, 1994

[54] POROUS LOW DENSITY SHOT-LIKE DEGRADABLE ABSORBENT MATERIALS AND MANUFACTURING PROCESS THEREFOR

[76] Inventor: Douglas E. Ellis, 16606 - 20th Avenue, White Rock, British Columbia, Canada, V4B 1T7

[21] Appl. No.: 840,297

[22] Filed: Feb. 24, 1992

[51] Int. Cl.⁵ .............................................. D21J 3/00
[52] U.S. Cl. ................................ 162/100; 162/158; 162/168.1; 162/175; 162/189; 162/DIG. 9; 119/172; 210/924; 264/115; 264/117; 264/118; 264/122; 264/140; 264/141
[58] Field of Search .................. 162/100, 168.1, 158, 162/175, DIG. 9, 189, 231; 119/172; 210/924; 264/117, 118, 122, 115, 140, 141

[56] References Cited

U.S. PATENT DOCUMENTS

| | | | |
|---|---|---|---|
| 4,374,974 | 2/1983 | Kok | 264/122 |
| 4,519,918 | 5/1985 | Ericsson et al. | 210/680 |
| 4,537,877 | 8/1985 | Ericsson | 502/402 |
| 4,560,527 | 12/1985 | Harke et al. | 162/DIG. 9 |
| 4,621,011 | 11/1986 | Fleischer et al. | 119/172 |
| 4,931,139 | 6/1990 | Phillips | 162/100 |
| 5,018,482 | 5/1991 | Stanislowski | 119/172 |
| 5,100,600 | 3/1992 | Keller et al. | 119/172 |

FOREIGN PATENT DOCUMENTS

| | | | |
|---|---|---|---|
| 111467 | 6/1984 | European Pat. Off. | 119/172 |
| 2-265968 | 10/1990 | Japan | 119/172 |
| 2-308736 | 12/1990 | Japan | 119/172 |

*Primary Examiner*—Peter Chin
*Attorney, Agent, or Firm*—J. Robert Cassidy

[57] ABSTRACT

Degradable particulate absorbent materials and processes for manufacture, wherein the absorbent materials have: i) in most forms of the invention, on the order of not more than 10% by weight inorganic solids or "fillers" and in all cases less than 30% inorganic solids by weight; ii) an open, porous, shot-like fiber structure with low bulk density on the order of not more than 30 lbs./ft.³ and, preferably, in the range of 15 to 18 lbs./ft.³.

32 Claims, No Drawings

POROUS LOW DENSITY SHOT-LIKE DEGRADABLE ABSORBENT MATERIALS AND MANUFACTURING PROCESS THEREFOR

RELATED APPLICATIONS

Christopher R. Phillips U.S. application Ser. No. 07/236,678, filed Dec. 31, 1987, as a continuation-in-part of Phillips U.S. application Ser. No. 07/000,139 filed Jan. 2, 1987 (now abandoned); and, issued on Jun. 5, 1990, as U.S. Pat. No. 4,931,139 entitled "Degradable Absorbent Material And Manufacturing Process Therefor" assigned to the assignee of the present invention.

Christopher R. Phillips U.S. application Ser. No. 07/403,575, filed Sep. 5, 1989, as a divisional. application based on the aforesaid Phillips application Ser. No. 07/236,678 and copending with the present application; and, issued on Feb. 25, 1992, as U.S. Pat. No. 5,091,245 entitled "Degradable Absorbent Material" assigned to the assignee of the present invention.

BACKGROUND OF THE INVENTION

1. Technical Field

The present invention relates generally to absorbent materials and processes for the manufacture thereof; and, more particularly, to shot-like absorbent materials which, despite their exterior appearance resembling pellets or buckshot, are, nonetheless, characterized by an open, porous fiber structure containing less than 30%, and preferably not more than 10% inorganic solids or "fillers" by weight and a low bulk density of less than 30 lbs./ft.$^3$ and, preferably, in the range of not more than 15 to 18 lbs./ft.$^3$. Shot-like absorbent materials made in accordance with the present invention are readily degradable by incineration or the like following usage as an absorbent; and, may be either hydrophilic or hydrophobic—e.g., oleophitic—in nature, thereby permitting usage of the hydrophilic forms of the invention as industrial floor sweeps, beddings for use with small animals, kitty litter and the like, while permitting usage of the hydrophobic forms of the invention for species specific absorption purposes such, merely by way of example, as the absorption of oil spills from both land and water environments, as well as absorption of other toxic liquid and/or odoriferous materials and/or other liquid contaminants.

More specifically, the present invention utilizes, as a basic ingredient, cellulose fibers of the type commonly generated in wood pulping, paper making or paper recycling operations; and, more particularly, cellulose fibers having a relatively low content of inorganic solids—e.g., clays and/or other silica compounds, commonly referred to as "fillers". Preferably, the cellulose fibers used with the present invention include not more than 10% inorganic solids by weight and, in any event, less than 30% inorganic solids by weight. Ideally, however, the cellulose fibers employed with the present invention have no inorganic solids content; but, as a practical matter, waste or process streams from most pulp and/or paper mills will include some inorganic solids or "fillers". Typically, such cellulose fiber materials having relatively low inorganic solids content are generated as a waste bi-product at the discharge end of a sulfite bleach mill used in the pulping industry such, for example, as in the pulp mill of Georgia Pacific Corporation located in Bellingham, Wash. However, as the ensuing description proceeds, those skilled in the art will appreciate that the invention is not limited to use with the discharge wastes of sulfite bleach pulp mills but, rather, can be used with cellulose fiber materials generated in other conventional pulping and/or paper making and/or recycling processes that produce streams containing cellulose fibers wherein the streams have low inorganic solids content.

BACKGROUND OF THE INVENTION

Heretofore clay-based materials and other inorganic absorbents have been utilized in the control and removal of undesired liquids from industrial floors and walkways and similar industrial environments. But, until the advent on the products disclosed in the aforesaid Phillips U.S. Pat. Nos. 4,931,139 and 5,091,245 assigned to the assignee of the present invention, such materials have not been: i) sufficiently effective as determined by absorptive capacity; ii) convenient as determined by bulk density, typically 25 to 40 lbs./ft.$^3$; or iii), readily decomposable or degradable, as the wholly inorganic constituents, typically at least 30% inorganic solids by weight and often up to 50% or more inorganic solids by weight, preclude incineration even when saturated with combustible liquid material or the like.

One recent advance in absorptive media entails the pelletization of cellulose fibers and clay and/or other inorganic solids as disclosed in U.S. Pat. No. 4,374,794—Kok. However, the action of pelletizing a combination of cellulose fibers and inorganic solids or "fillers" as disclosed in the Kok '794 patent requires use of considerable force applied to the material in order to extrude it from a die orifice. The requisite force is a compressive action that: i) eliminates interstitial spaces in the body of the pellet; ii) creates a non-porous pellet structure having a hard, non-porous, high sheen outer shell; iii) creates a dimensionally stable, substantially incompressible, cylindrical shape; and iv), results in a product having a bulk density typically ranging from 25 to 40 lbs./ft.$^3$ Moreover, when used as an absorptive media on floor surfaces, the highly compacted, dense, extruded pellets of Kok have extremely hard, round, outer shells highly resistant to compressive forces; and, therefore, they present a hazardous rolling interface between the floor surface and pedestrian traffic. Further, such non-porous extruded pellets exhibit low absorptive capacities and, because of their size, they present only a limited surface contact area to liquid contaminants on a floor or other flat surface.

Two other early patents of interest are those issued to Papyrus Kopparfors A.B. of Mölndal, Sweden as the assignee of Thomas Ericsson, U.S. Pat. No. 4,537,877, and as the assignee of Thomas Ericsson et al, U.S. Pat. No. 4,519,918. Thus, in the Ericsson '877 patent, the patentee discloses various examples of a particulate oil-absorbing composition comprising at least 50% by weight hydrophobic cellulose pulp fibers " . . . blended with at least 30% up to 50% of an inorganic cellulose paper pulp filler." See, Col. 1, lines 48 and 49 of U.S. Pat. No. 4,537,877. Unfortunately, the inclusion of large amounts of inorganic cellulose paper pulp fillers—including particularly amounts in the range proposed by Ericsson comprising at least 30% by weight and ranging up to 50% by weight of the basic composition—presents a number of problems. First and foremost, the inorganic solids or "fillers" tend to increase the bulk density of the resulting product which generally ranges from 16 to 20 lbs./ft.$^3$; and, as a consequence, even though the product is hydrophobic, upon saturation with oil it will not float. Moreover, the large amount of inorganic solids present tends to reduce both the rate of absorption and the absorptive capacity of the product produced. Additionally, the inorganic solids are not readily flammable and/or degradable; and, cannot be satisfactorily disposed of by incineration, thus producing a significant quantity of non-degradable ash, which creates a high-cost disposal problem, and reduces the amount of heat that can be generated per cubic volume of waste material. The inorganic solids present further create significant dust problems resulting in eye and/or breathing irritants, undesirable abrasion of production equipment and, indeed, a severe explosion hazard.

In the Ericsson '877 patent, it is proposed to render the cellulose fibers hydrophobic by sizing with rosin; whereas in the Ericsson et al '918—a patent which is subject to all of the disadvantages mentioned above which are inherent in the Ericsson '877 patent—the fibers are rendered hydrophobic by impregnation with liquid resinous materials. In both cases, no provision is made for conditioning the particulate materials to insure that the fiber ends do not project outwardly from the fibrous particles; and, as a consequence, the particulate materials of Ericsson and Ericsson et al exhibit a fuzzy surface appearance which results in breakage of fiber ends, increasing the dust problem, while causing clinging and compaction of adjacent particles.

The aforesaid Phillips patents assigned to the assignee of the present invention—viz., Phillips U.S. Pat. Nos. 4,931,139 and 5,091,245 which have identical disclosures, the latter having issued from an application co-pending herewith—are, in fact, directed to, and disclose, products which have proven commercially successful and which have overcome a number of disadvantages inherent in the prior art such as that exemplified by the Kok '794, Ericsson '877 and Ericsson et al '918 patents. Thus, the Phillips '139 and '245 patents disclose absorbent materials which: i) are not pelletized, are not densely packed and exhibit none of the disadvantages inherent in the Kok and/or Ericsson pellets; ii) are generally flat as contrasted with round, tubular or spherical; iii) contain not more than 30% inorganic solids or "fillers" by weight and, preferably, not more than 10% inorganic solids; and iv), have a relatively low bulk density of not more than 13 lbs./ft.$^3$ and, preferably, from about 8 to only about 10 lbs./ft.$^3$.

However, such products, while having relatively high absorptive capacities in terms of the percentage of liquid absorbed by weight when contrasted with other known prior art products, have been found to suffer from some disadvantages. For example, the low bulk density of the products results in a relatively lightweight particle that tends to blow around; and, the relatively large, generally flat, shape of the particles tends to exacerbate this problem as well as detracting from the ability of the particles to effectively contact and absorb all of the liquid material to be absorbed. Moreover, the Phillips products, although exhibiting an excellent absorptive capacity when measured as a percentage by weight enabling absorption of up to on the order of three times or more liquid than can be absorbed by other prior art products, do not provide a significant improvement when absorptive capacity is measured as a percentage by volume. Thus, it has been found that the absorptive capacity of the Phillips products as a percentage of volume is merely comparable to other prior art absorptive materials.

SUMMARY OF THE INVENTION

The present invention overcomes all of the disadvantages inherent in the prior art as exemplified by the foregoing Kok, Ericsson, Ericsson et al and Phillips patents by substantially eliminating the foregoing problems while, at the same time, taking advantage of the beneficial aspects of the prior art and, particularly, the beneficial aspects of the Phillips patents. Thus, particulate absorbent materials of the present invention have a shot-like external appearance resembling pellets or buckshot, yet wherein the particles are not extruded and do not have the hard, dense, non-porous outer shell typical of conventional prior art extruded pellets such as those disclosed in the Kok '794 patent, nor do they possess the undesirable characteristic of low compressibility which characterizes conventional prior art pellets.

Rather, absorbent materials made in accordance with the present invention have: i) in most forms of the invention, on the order of not more than 10% by weight inorganic solids or "fillers" and in all cases less than 30% inorganic solids by weight; ii) a soft, agglomerated, open, porous, shot-like fiber structure with a bulk density on the order of not more than 30 lbs./ft.$^3$ and, preferably, will range of from about 13 to less than 30 lbs./ft.$^3$ and most preferably in the range of 15 to 18 lbs/ft.$^3$ and wherein the particles, although generally rounded, are highly compressible due to their soft, open, porous structure, thereby minimizing the danger of rolling and/or slippage when subjected to pedestrian traffic while, at the same time, the slightly increased bulk density and smaller particle size when contrasted with products such as disclosed in the aforesaid Phillips patents renders the particles more resistant to blowing and enhances surface contact between the particles and liquid contaminants so as to increase absorption efficiency; iii) shape and size gradations typical of clay based floor sweeps and animal litters—i.e., particles embodying the invention are both smaller and more diverse in size than conventional pellets such as those of Kok and/or Ericsson; iv) an absorptive capacity by weight up to four times greater than that of clay products and by volume up to twice that of products disclosed in the aforesaid Phillips U.S. Pat. Nos. 4,931,139 and 5,091,245; v) high retention rates for products absorbed; and vi), rapid absorption rates when compared with clay products and extruded tubular pellets; yet which: vii) are highly flammable both before and after absorption of liquid materials which are often nonflammable and, therefore, which have high heat values for recycling as an energy source; viii) produce little ash when incinerated, thereby minimizing disposal costs and related problems; ix) are biodegradable in an aerobic atmosphere given suitable moisture and temperature; x) permit the addition of additives to rapidly biodegrade absorbent particulates and a wide range of hydrocarbon-based oils and chemicals; and xi), permit addition of process chemicals rendering the otherwise hydrophilic absorbent materials hydrophobic—e.g., oleophitic—and/or forming barriers/filters for toxic and/or noxious odors.

Ideally the invention contemplates the use of cellulose fiber materials having no inorganic solids or "fillers" at all; although, given the state of the known technology available today, it is generally necessary to use cellulose materials—for example, waste cellulose materials—having from on the order of 2%, or less, inorganic solids by weight to on the order of 10% inorganic solids, but in any event, less than 30% inorganic solids by weight. Thus, it will be understood by those skilled in the art that references in the ensuing Detailed Description and in the appended claims to cellulose materials having "minimal inorganic solids content" shall mean a cellulose material having: i) less than 30% inorganic solids content by weight even when used as a litter material where inorganic solids may be added to increase the inorganic solids content to on the order of 25% so as to increase the flushability of used litter material; ii) preferably not more than 10% inorganic solids content by weight; and iii), ideally, either no inorganic solids content or as little inorganic solids content as possible.

In carrying out the process of the present invention for forming highly degradable absorbent materials, the cellulose fibers are mixed and/or re-pulped with water so as to form a slurry comprising approximately 96.5% water and 3.5% total solids by weight. One or more pH modifying chemicals commonly found in the paper industry— such, for example, as calcium carbonate and/or aluminum sulfate—may be added to the slurry as needed to modify the pH as felt appropriate for consumer use. A suitable flocculant may also be added to slurry to aid in dewatering. It will, upon reading the ensuing Detailed Description, become apparent to persons skilled in the art relating to paper manufacture that, at any suitable point during this stage in the process, an internal sizing and/or hydrophobic water repelling agent may be added to the slurry.

The slurry is then transferred to a slurry press where excess water is removed from the slurry to make a press cake which is in the range of 15% to 50% and, preferably, approximately 25%, total solids by weight. The press cake is then shredded to a size suitable for feed into a turbulator. The turbulator further reduces and conditions the press cake to a size suitable for feed stock to an agglomerator. Additional absorption enhancing additives such a dry starches or super absorptive polymers may be introduced into the turbulator at a rate of up to 50% dry solids by weight. The agglomerator rolls the product in a manner which tightly locks the fiber ends into a ball. Additional water and/or chemicals may be added at this point to enhance the product's hydrophobic, oleophitic or odor controlling qualities. This liquid may also be used to aid in the agglomeration process.

The resulting product comprises small, soft, generally rounded balls having size gradients ranging from about 6.2 mm ($\frac{1}{4}$") or slightly larger to about 1.6 mm (1/16") or slightly smaller. The product may be sorted with suitable screening machines to provide a desired range of graded sizes. Undesirable sized product can be returned to any location ahead of the turbulator for reprocessing. Product within the desired size range is then fed into a dryer where additional moisture is removed to increase the solids content of the particle to preferably 88% to 95% dry solids. It is essential that the material be dried to at least 75% total solids by weight so as to minimize bacteriological degradation; and, indeed, it is preferable that all moisture in excess of the water of hydration be removed.

A degradable material produced in accordance with the foregoing process will be hydrophilic by nature, except where treated to be hydrophobic, having: i) a density of typically 13 to 18 lbs./ft.$^3$ and, in all cases, less than 30 lbs./ft.$^3$; and ii), having an unfractured, smooth, rounded shape and a size gradation which insures that in excess of 90% of the product will pass through a $\frac{1}{4}$" or 6.2 mm sieve. The particles thus produced are characterized by a porous surface allowing for rapid absorption and strong capillary attraction of liquids. The product is characterized by its soft, open, porous fiber structure and is highly compressible so as to preclude the tendency of the particles to act like rollers or ball bearings when subjected to pedestrian traffic. The small rounded particle size and slightly increased bulk density as contrasted with the products disclosed in the aforesaid Phillips patents allows for a substantially higher absorptive capacity by volume and a greater ability to absorb or retrieve the liquid contaminant sheen from pavements and floors while allowing for a wider range of applications in windy areas. Yet, the particles are still light enough to be economically transported and easily carried in large volumes. Moreover, the substantially reduced amount of inorganic solids present in the product of the present invention as contrasted with prior products (other than the Phillips products) ensures ready degradation by incineration following use, or use as an alternative fuel source, or the like, thus maximizing the heat values produced and minimizing the quantity of ash which must be disposed of as well as attendant disposal costs.

When used as a litter material for cats and similar animals, inorganic solids may be added to the slurry so as to increase the total inorganic content of the solids in the slurry to approximately 25% of the total solids present by weight but, in any event, less than 30% of the total solids present by weight, thus enhancing the flushability of used litter material. Moreover, when used as either a litter material or as a bedding material for animals, or when used as an absorbent for other noxious and/or odoriferous waste materials, the absorbent material of the present invention can incorporate a suitable deodorant and/or vapor barrier which either serves to absorb noxious fumes and/or odorants or to prevent dissemination thereof into the surrounding atmosphere. The soft, somewhat heavier, smooth, generally rounded qualities of absorbent materials made in accordance with the present invention serve to reduce the problems of product clinging to fur and tracking which have been inherent with absorbent materials made in accordance with the aforesaid Phillips '139 and '245 patents, as well as minimizing safety problems associated with the hard, substantially incompressible, pelletized products disclosed in the aforesaid Kok '794, Ericsson '877 and Ericsson et al '918 patents. Products embodying the present invention are, rather, characterized by size, shape and density closely resembling that of typical clay litter products allowing for quick acceptance by both animals and their keepers.

While the invention is susceptible of various modifications and alternative forms, specific embodiments thereof have been described herein by way of example. It should be understood, however, that it is not intended to limit the invention to the particular forms disclosed; but, on the contrary, the intention is to cover all modifications, equivalents and alternatives falling within the spirit and scope of the invention as expressed in the appended claims.

DETAILED DESCRIPTION

In accordance with one of the important aspects of the present invention, provision is made for forming readily degradable, particulate, absorbent materials from cellulose fibers having minimal inorganic solids content—i.e., less than 30% inorganic solids by weight; preferably less than 10% inorganic solids by weight; and, ideally at, or approaching, 0% inorganic solids by weight—where such readily degradable absorbent materials have: i) in most forms of the invention, on the order of not more than 10% by weight inorganic solids or "fillers" and in all cases less than 30% inorganic solids by weight; ii) an open, porous, shot-like fiber structure with low bulk density on the order of not more than 30 lbs./ft.$^3$ and, preferably, will range of from about 13 to less than 30 lbs./ft.$^3$ and most preferably in the range of 15 to 18 lbs./ft.$^3$; iii) shape and size gradations typical of clay based floor sweeps and animal litters; iv) an absorptive capacity by weight up to four times greater than that of clay products and by volume up to twice that of products disclosed in Phillips U.S. Pat. Nos. 4,931,139 and 5,091,245; v) high retention rates for products absorbed; and vi), rapid absorption rates when compared with clay products and extruded tubular pellets.

As a consequence of achieving these objectives, the particulate absorbent materials embodying the invention are highly flammable both before and after absorption of liquid materials which are often non-flammable; and, therefore, they are characterized by high heat values for recycling as an energy source. Moreover, they produce little ash when incinerated, thereby minimizing disposal costs and related problems. Such products are also biodegradable in an aerobic atmosphere given suitable moisture and temperature. Additionally, they readily permit the addition of additives to rapidly biodegrade absorbent particulates and a wide range of hydrocarbon-based oils and chemicals, as well as addition of process chemicals rendering the otherwise hydrophilic absorbent materials hydrophobic—e.g., oleophitic—and/or forming barriers/filters for toxic and/or noxious odors.

Cellulose fibers suitable for use in the practice of the present invention can be obtained from sulfite, sulfite-acid, groundwood, sulfate, thermomechanical and kraft process mills for forming pulp, as well as from a variety of other sources such as recycled pulp and/or paper operations as well as other paper making operations. The types of inorganic solids which are commonly present in such cellulose fiber materials include, but are not limited to, kaolin, China clay, talc, calcium carbonate and silica mineral complexes; but, as previously indicated, it is preferable to employ a cellulosic fiber material having a minimal content of inorganic solids of the foregoing types.

In keeping with this aspect of the invention, the cellulose fibers are mixed and/or re-pulped with water, preferably in any suitable agitation tank, so as to form a water/fiber slurry comprising approximately 96.5% water and approximately 3.5% total solids by weight wherein the solids content of the slurry comprises cellulose fibers having minimal inorganic solids content and constituting in the range of about 94% to about 99.5% and, preferably, approximately 99% by weight of total dry solids. A suitable pH modifier such, for example, as calcium carbonate and/or aluminum sulfate, may be added to the slurry, as required, to adjust the pH level of the slurry to that level deemed appropriate for the particular consumer use envisioned—for example, perhaps to a range of from about 4.5 to about 6.5. Those skilled in the art will appreciate that a wide variety of acidic additives can be employed; but, excellent results have been achieved using, for example, aluminum sulfate or "Alum" [$Al_2(SO_4)$] which is marketed by Stauffer Chemical Co. of Westport, Conn. A suitable flocculant may also be added to slurry in the agitation tank to aid in dewatering. If a hydrophobic absorbent material is the desired end product, any suitable internal sizing and/or hydrophobic water repelling agent may be added to the slurry during formation thereof.

The water/fiber slurry is, either with or without such additives, then transferred to a slurry press where excess water is removed from the slurry to make a press cake which is in the range of about 15% to about 50% total solids by weight, and preferably approximately 25% total solids by weight. The press cake is then shredded to a size suitable for feed into a turbulator or other desired high shear blender or the like. The turbulator further reduces and conditions the press cake particulate to a size suitable for feed stock to an agglomerator which serves to roll the particulate in a manner which tightly locks the fiber ends into a ball.

As a purely optional additive and process step, a suitable latex emulsion can be added to the slurry introduced into the turbulator for purposes of promoting adhesion of the cellulose fibers one to another. Although the use of such a latex emulsion is normally unnecessary when practicing the present invention, in those instances where it is employed, the emulsion should constitute in the range of about 0.5% to about 5.0% and, preferably, about 1% of the total dry solids present in the slurry by weight. While those skilled in the art will appreciate that a wide variety of latex emulsions can be employed to promote adhesion of the fibers one to another, particularly advantageous results have been obtained when using a water insoluble latex emulsion marketed by Dow Chemical U.S.A. of Midland, Mich. under the product designation DL244A.

In carrying out the process of the present invention to form industrial grade hydrophilic liquid absorbents which are readily degradable and attain the objectives of the invention, the water/fiber slurry produced in the agitation tank is, after sufficient agitation to insure a homogeneous mix of the slurry constituents—viz., water and cellulose fibers; and, if desired, a pH control agent and/or a suitable flocculant and/or, optionally, a suitable latex emulsion-transferred to a conventional press to dewater the slurry and form a mat or press cake having in the range of about 15% to about 50%, and preferably on the order of about 25%, total dry solids by weight. Those skilled in the art will appreciate that the press may take many well known, conventional and commercially available forms—e.g., a V-press, a screw press, a vacuum drum, or the like—but, excellent results have been achieved using a conventional high-pressure belt press of the type manufactured by Parkson Co. of Fort Lauderdale, Fla. and marketed under the product designation Magnum Series 3000-2.0.

To promote flocculation of the solids content of the slurry and adhesion of the fibers one to another, it has been found desirable in some, but not all, instances to add a suitable flocculating agent to the slurry produced in the agitation tank prior to delivery thereof to the press. Such flocculating agent may take various forms; but, particularly desirable results have been achieved when using Polymer 1264 manufactured by Betz Paper Chem, Inc. of Jacksonville, Fla. as a flocculating agent. Such flocculating agent may be added to the slurry as it is transferred from the agitation tank to the press. The quantity of flocculating agent added may vary widely dependent upon such diverse variables as the type of flocculating agent employed, the nature and content of the slurry, etc. However, it has been found that the quantity of flocculating agent is not critical provided only that as the flocculating agent is added to the slurry, the operator visually observes the slurry; and, when flocculation or "clumping" of the fibers is observed (accompanied by clearing of the water which theretofore exhibited a milky appearance in those instances where an optional latex emulsion has been employed), the addition of further flocculating agent can be terminated.

During the next step of the operation, the press cake is placed into a coarse shredding device such as a cake breaker and/or a cut-and-fold screw conveyor. This device should be capable of reducing the size of the shredded, particulate press cake materials to less than $4'' \times 2'' \times \frac{1}{2}''$. The resulting product is then run through a high shear turbulator such as a Model 12T35 turbulator available from Ferro-Tech of Wyandotte, Mich. However, it will be understood that persons skilled in the art will be able to duplicate the action of a conventional high shear turbulator with a wide range of high shear blenders and/or shredders. Such high shear turbulators or equivalent blenders and shredders are designed to reduce the particle size down to a fluffy $\frac{1}{2}''$ maximum size.

Additional absorption enhancing additives such as dry starches or super absorptive polymers (SAP) may be introduced into the high shear turbulator in an amount up to about 50% dry solids by weight. Additional water may also be added to the turbulator at this stage in the process to bring the total solids content down to the approximate 25% total solids by weight range.

While the foregoing description has related specifically to a process for forming industrial grade hydrophilic liquid absorbents, in those instances where it is intended to form a hydrophobic liquid absorbent—e.g., an oleophitic absorbent material—it is merely necessary to add any suitable internal size and/or water repelling agent to the slurry as it is removed from the agitation tank. A particularly excellent internal size suitable for this purpose comprises Bersize No. 6991 available from Bercen, Inc. of Cranston, R.I. Moreover, where desired, suitable chemicals may be added to the particulate material in the turbulator to enhance the product's hydrophobic, oleophitic or odor controlling properties. The addition of liquids to the product at this stage also tends to aid in the ensuing agglomeration process.

The resulting particulate material produced in the turbulator or equivalent high shear blender or shredder is then fed onto or into any suitable agglomerator such, for example, as a Model No. 036 rotating pan agglomerator supplied by Ferro-Tech. However, persons skilled in the art may choose to use alternate agglomerating equipment such, merely by way of example, as a drum agglomerator and/or a rotary dryer. Additional agglomerating enhancing liquids may be added along with the particulate such, for example, as water and/or a water/starch mixture. Additional surfactants, odor controllers, and/or aromatic scents may be added to the particulate material in the agglomerator to enhance the end product's wettability and/or odor control. Moreover, any suitable external size can be added to the particulate material in the agglomerator to either render an otherwise hydrophilic material hydrophobic; or, in those instances where an internal size and/or hydrophobic water repelling agent has been added to the slurry in the agitation tank, to enhance the particulate material's hydrophobic properties.

Persons skilled in the art will recognize that a wide range of surfactants are available for the foregoing applications including, merely by way of example, a wetting agent such as BPS104 supplied by Betz Paper Chem, Inc., and Surfynol No. 104 supplied by Air Products of Allentown, Pa. Odor controlling agents such as X-O from X-O Corporation of Moberly, Tex., may be employed. Suitable waterproofing surfactants and/or external sizes include, merely by way of example, Bersize No. 4450 from Bercen, Inc.

Drying of the particles is accomplished by delivering the particulate material output from the agglomerator or equivalent high shear blender or shredder to a fluidized bed dryer of conventional manufacture and available from such entities as, for example Carmen Industries of Jeffersonville, Ind. and/or Dresser Industries of Hillsboro, Oreg., utilizing an inlet airstream temperature in the range of 170° C. to 240° C. and, preferably, 180° C. to 200° C. The particles exit the dryer after a residence time of approximately fifteen (15) minutes with a total dry solids content in excess of about 75% by weight, preferably in the range of about 80% to about 92% by weight, and most preferably in the range of from about 88% to about 90% by weight. A rotary kiln dryer may be preferable for this application as such equipment has a much higher efficiency rating and works with an acceptable tumbling action.

The bulk density of the liquid absorbent particles produced is, of course, a function of the original fiber, the ratio of non-fibrous additives to organic fibers by weight, the final total dry solids by weight, the set-up of the agglomerator, and the agglomerating fluids added. Such variables may be adjusted, as desired, to produce products having desired characteristics particularly suitable to the end application to which the user is to put the product. However, a bulk density of about 15 to about 18 lbs./ft.$^3$ is desirable and attainable without the addition of non-fibrous fillers.

The product's size and shape may also be adjusted with changes made at all stages of the process. It is, however, desirable to keep the particulate shape nearly round with substantially no free projecting fiber ends. It is also desirable to have the particle size controlled such that at least 90% of the product, by weight, will pass through a $\frac{1}{4}''$ or 6.2 mm screen; yet, wherein there are virtually no particles small enough to form a nuisance dust.

EXAMPLE I

A general purpose industrial grade liquid absorbent embodying features of the present invention was made as follows:

First, waste cellulose fibers. having minimal inorganic solids content were obtained from a sulfite-acid pulping facility having a waste discharge stream containing a total solids content of 28% with an inorganic solids content of 5%. A 20,000 gallon batch of slurry was prepared as described above by addition of sufficient water to the cellulose fibers in an agitation tank to produce a water/fiber slurry containing 96.5% water and 3.5% total dry solids; and, wherein the total dry solids comprised: i) approximately 99% organic cellulose fibers having minimal inorganic solids content—viz., approximately 5% inorganic solids by weight; and ii), a small quantity of aluminum sulfate [$Al_2(SO_4)$] sufficient to reduce the pH value of the slurry to approximately 5. The resultant slurry was then transferred to a Parkson Co. Magnum Series 3000-2.0 belt press while a small amount of flocculant (Betz Polymer 1264) was added sufficient to evidence initiation of visibly observable flocculation of the solids. The slurry/flocculant mixture was dewatered in the Parkson Co. belt press to form a press cake containing 40% total solids by weight. Thereafter, the press cake was shredded in a Miller Franklin TASKMASTER shredder. The particulate fibrous material output from the shredder was then run through a Ferro-Tech Model 12T35 high shear turbulator and fed to a Ferro-Tech Model No. 036 rotating pan agglomerator where 0.5% by dry solids weight of a suitable surfactant—e.g., DPS 1104 from Betz Paper Chem, Inc.—was added. The particulate material output from the agglomerator was then dried to a level of 90% total dry solids by weight.

The resulting liquid absorbent material manufactured in accordance with the present invention was then compared with: i) absorbent particles made in accordance with EXAMPLE I in the aforesaid Phillips '139 and '245 patents; ii) a conventional clay floor sweep purchased locally; and iii), two varieties of pellets designated herein as "A" and "B", each of which were composed of cellulose fibers and inorganic solids and which are available commercially from various retail establishments located throughout the United States. The comparative bulk densities of the product of the present invention, the Phillips product, the clay floor sweep, and the commercially available pellets 37 A" and "B" are set forth in Table I, while the superior absorptive abilities of the liquid absorbent media produced in accordance with the present invention as compared with each of the foregoing prior art products are set forth in Tables II and III.

As can readily be discerned from the comparative figures set forth in Tables I, II and III, the absorptive media prepared in accordance with the present invention is far superior to the invention disclosed in the aforesaid Phillips '139 and '245 patents, conventional

TABLE I

| | Bulk Density lb./ft.$^3$ | | | | |
| --- | --- | --- | --- | --- | --- |
| | Present Invention | Phillips Pat. Nos. '139 and '245 | Clay as Tested | Pellet A | Pellet B |
| lbs./ft.$^3$ | 15.2 | 7.0 | 27.7 | 25.24 | 32.28 |

TABLE II

| | Absorptive Capacity % by weight (uptake media, standard hydraulic oil) | | | | |
| --- | --- | --- | --- | --- | --- |
| | Present Invention | Phillips Pat. Nos. '139 and '245 | Clay as Tested | Pellet A | Pellet B |
| 1 minute | 215 | 290 | 100 | 66 | 61 |
| 1 hour | 239 | 293 | 100 | 77 | 70 |
| 16 hours | 244 | 301 | 109 | 83 | 71 |

TABLE III

| | Absorptive Capacity % by volume (uptake media, standard hydraulic oil) | | | | |
| --- | --- | --- | --- | --- | --- |
| | Present Invention | Phillips Pat. Nos. '139 and '245 | Clay as Tested | Pellet A | Pellet B |
| 1 minute | 53 | 33 | 45 | 27 | 31 |
| 1 hour | 59 | 33 | 45 | 31 | 36 |
| 16 hours | 60 | 34 | 49 | 33 | 37 | clay products, and commercially available pellets in terms of absorption capacity as measured by percentage volume. Moreover, while absorptive particles made in accordance with the present invention do not exhibit an absorptive capacity in terms of percentage by weight which is as high as that achieved by the Phillips products, nonetheless, when contrasted with conventional clay products and commercially available pellets, the present invention exhibits absorption capacities by percentage weight in excess of two times that achieved by clay products and up to in excess of three times that achieved with commercially available pellets.

However, in an industrial situation, high absorptive capacity by percentage volume is a significantly important consideration; and, when combined with high absorptive capacity by percentage weight, the composite improvement in absorption capacity can substantially reduce the impact of spills while reducing the cost of labor, transportation and disposal.

Moreover, the absorptive media prepared in accordance with the present invention does not present the safety problems common with hard pellets which are substantially incompressible, since the product of the present invention can, due to its soft, open, porous fiber structure, be easily compressed and flattened to a non-rollable pancake shape under weights far less than that experienced with normal pedestrian traffic. The present invention also exhibits many advancements over most inorganic floor sweeps. Thus, silica dust, which is common to commercially available clay products, has been noted to be a carcinogen. Therefore, such products cannot be incinerated or biodegraded for disposal; and, it costs many times more to landfill a given volume of liquid absorbed with clay than it costs to incinerate the product of the present invention.

Other natural organic sorbents such as peat constitute dusty, hard-to-handle products; and, can have in excess of 85% by weight of such product pass through a 1/16" sieve. The product of the present invention, on the other hand, has been produced where less than 1% by weight passes through a 1/16" sieve. Referring to Table IV, a sieve analysis of the product of the present invention has been presented contrasting high and low size ranges for the products of the present invention with a conventional clay product and, additionally, contrasting both a conventional clay product and products made in accordance with the present invention with: i) products embodying the aforesaid Phillips invention; ii) products made in accordance with the aforesaid Ericsson '877 patent in pelletized form; iii) commercially available Pellet "A"; and iv), peat.

It can be readily discerned upon inspection of Table

TABLE IV

Particle Size Distribution
(percent retained on sieve by weight)

| Sieve Size | Clay as Tested | Present Invention | Phillips Pat. Nos. '139 & '245 | Ericsson Pellet Pat. No. '877 | Pellet A | Peat |
|---|---|---|---|---|---|---|
| 12.5 mm | 0% | 0% | 16.7% | 0% | 0% | 3.0% |
| 9.5 mm | 0% | 0% | 26.4% | 0% | 0% | 0% |
| 6.2 mm | 0% | 0% | 32.5% | 0% | 0% | 3.0% |
| 2.3 mm | 45% | 51.7% | 20.5% | 88.0% | 98.2% | 7.0% |
| 1.2 mm | 36% | 34.8% | 2.0% | 9.0% | 1.0% | 27.0% |
| 0.6 mm | 11% | 12.9% | 1.1% | 2.5% | 0.5% | 34.0% |
| fines | 8% | 0.6% | 0.8% | 0.5% | 0.3% | 26.0% |
|  | 100% | 100% | 100% | 100% | 100% | 100% |

IV that products made in accordance with the present invention are unique in that their size characteristics comprise a relatively close match to the size characteristics of an inorganic clay product which the product of the present invention is intended to replace; whereas products made in accordance with the invention disclosed in Phillips Pat. Nos. '139 and '245, products made in accordance with Ericsson Pat. No. '877, Pellet "A", and peat do not closely match the size characteristics and gradients of inorganic clay products.

The absorbent media of the present invention was then compared with absorbent media of the type disclosed in the foregoing Ericsson '877 patent. The bulk density of the absorbent media of the present invention was, as indicated in Table I, 15.2 lbs./ft$^3$; whereas the bulk density of the Ericsson absorbent material was 19.36 lbs./ft.$^3$. In terms of absorptive capacity by percentage weight, and as shown in Table II, the present invention exhibited the capacity to absorb an amount of standard hydraulic oil equal to 215% of its weight in only one (1) minute and 244% of its weight in sixteen (16) hours—viz., the absorbent material of the invention reached virtually its full capacity of absorption in only one (1) minute. The Ericsson material, on the other hand, was capable of absorbing an amount of the standard hydraulic oil equal to only 133% of its weight in one (1) minute—e.g., only about 62% of the amount of oil absorbed by the particles embodying the present invention in one (1) minute—reaching its maximum capacity of 156% of its weight—e.g., only about 64% of the amount absorbed by particles of the present invention—after sixteen (16) hours.

Of even more significance, and as will be noted from Table III, the present invention exhibited the capacity to absorb an amount of standard hydraulic oil equal to 53% of its volume in one minute and 60% of its volume in 16 hours. The Ericsson material, on the other hand, was capable of absorbing an amount of standard hydraulic oil equal to only about 39% of its volume in one (1) minute—i.e., only about 74% of the absorption capacity by volume of absorbent materials embodying the present invention—reaching its maximum capacity of 48% of its volume after sixteen (16) hours—viz., only 80% of the volumetric absorption capacity achieved with the present invention. The foregoing comparisons clearly demonstrate the superior absorbing characteristics of absorbent material made in accordance with the present invention as contrasted with the Ericsson pellet in terms of total absorptive capacity by weight, total absorptive capacity by volume, and rate of absorption.

Moreover, the absorbent media of the present invention, pellets made in accordance with the process disclosed in the Ericsson '877 patent, and absorbent particles made in accordance with the process disclosed in the Phillips '139 and '245 patents were then subjected to incineration. The quantity of total ash produced when incinerating the product of the present invention was only 5.2% by weight of the material subjected to incineration; the total ash produced from the Ericsson material represented 44% of the material incinerated; and, the total ash produced from the Phillips material represented 9.6% of the material incinerated. In short, the ash remaining to be disposed of after incineration of the Ericsson material was more than eight times the amount remaining after incineration of the product of the present invention; while the ash remaining from the Phillips product was almost twice that remaining from the present invention—thus again clearly evidencing the superiority of the present invention over the prior art.

Finally, the striking differences between absorbent materials made in accordance with the present invention and those disclosed in the foregoing Ericsson patents are readily discernible merely by side-by-side visual comparison of the two products. Thus, as shown in Table IV, products made in accordance with the present invention have a wide particle size distribution between a 6.2 mm sieve size and a 1.2 mm sieve size—i.e., 87% of the absorbent particles of the present invention had graded sizes ranging from a minimum size of approximately 1.2 mm to a maximum size of approximately 6.2 mm. Products made in accordance with the Ericsson '877 patent, on the other hand, exhibited a relatively uniform product size in pellet form—e.g., 88% of the pellets were of substantially uniform size. The graded particle size achieved with the present invention—as contrasted with Ericsson's pellets which are, for the most part, of uniform size—serves to insure that the gaps between adjacent larger particles are filled by smaller particles; and, thus allows for greater surface contact and absorption, while not providing a significant amount of small dusty particles which are subject to easy movement and loss in light winds.

Secondly, the product of the present invention does not have the hard, shiny, non-porous shell-like surface typically found on extruded pellet products such as produced in accordance with the Kok '794 patent and the aforesaid Ericsson '877 and Ericsson et al '918 patents; which shell-like surface only serves to form a barrier surrounding the absorbent material reducing the absorptive rate of the pellets.

Thirdly, products produced in accordance with the present invention comprise smooth, generally rounded shapes as contrasted with the tubular broken bar with jagged ends typical of most conventional pelletized products.

When the product of the present invention is compared with the shredded products produced in accordance with the aforesaid Ericsson patents, the visual difference is extreme. Thus, Ericsson's shredded products exhibit a loose fluff of interwoven fibers which have a vast majority of projecting loose fiber ends and an irregular rough surface, as would be expected from a high shear shredding operation. The product produced by the present invention, on the other hand, comprises a smooth, generally rounded ball with virtually no projecting loose fiber ends.

EXAMPLE II

A liquid absorbent material was prepared in accordance with the present invention in essentially the same manner as described above in connection with EXAMPLE I; except, in this instance, the pH value of the slurry was lowered to approximately 4.5 by the addition of aluminum sulfate [$Al_2(SO_4)$]; and, additionally, approximately 1% by dry weight of a water soluble deodorizing chemical commercially available from Cox Family Laboratories, Inc. of Lynden, Wash., was added to the product after pressing and prior to introduction into the turbulator. The resulting dried absorbent material was then tested by use as a cat litter. A series of odor generation tests were performed where animal urine was mixed with the product of this invention at a ratio of 200 grams urine to 100 grams absorbent material. This mixture was then placed in a sealed bucket and stored at a controlled temperature set at 90° F. The ammonia generated from aging urea was measured with ammonia detection tubes available from Mine Safety Appliances Company of Pittsburg, Pa. The calibration range for the detection tubes was 2.5 to 1600 parts per million (PPM). A wide range of commonly available cat litters and bedding were simultaneously tested in the same manner. The comparative test results are as shown in TABLE V.

As can readily be discerned from the comparative figures set forth in Table V, the product of the present invention reduced the development of odor causing ammonia significantly better than traditional litter and bedding

TABLE V

Ammonia generation from aging urine
PPM (parts per million) of ammonia

| Product | Time (hours) | | | |
|---|---|---|---|---|
| | 20 hrs. | 40 hrs. | 70 hrs. | 100 hrs. |
| Present invention | 0 | 0 | 2 | 6 |
| Clay Sample #1 | 0 | 18 | 50 | 200+ |
| Clay Sample #2 | 5 | 50 | 150 | 500+ |
| Pelletized Paper | 0 | 3 | 125 | 275 |
| Corn cob bedding | 0 | 3 | 50 | 75 |
| Hardwood chip bedding | 5 | 20 | 65 | 120 | product. This odor controlling quality, along with the high absorption capacity and lighter weight of products made in accordance with the present invention, constitutes a substantial improvement over traditional litter products.

EXAMPLE III

A hydrophobic hydrocarbon-specific absorbent material was formed in accordance with the process described in EXAMPLE I except: i) the liquid slurry was stabilized at a pH of 6.2 with the addition of first calcium carbonate and secondly aluminum sulfate [$Al_2(SO_4)$]; ii) an alkaline internal sizing agent manufactured by Bercen, Inc.—viz., Bersize No. 6991—was added to the slurry during its transfer to the press station at a rate of 1.2% by weight of dry solids; and iii), the surfactant DPS1104 was not added during the process. While those skilled in the art will recognize that there are a wide range of internal sizing agents which may be employed for this type of application, excellent results have been achieved utilizing Bersize No. 6991.

The resulting product was tested to determine its ability to absorb oil while repelling water using the following tests. A. A handful of product was placed in a 5-gallon bucket of water. The product stayed afloat for two weeks, at which time 30 weight non-detergent motor oil was added to the water. The product of this invention rapidly absorbed the motor oil. B. 50 grams of the product of this invention was placed in a 500 ml plastic cup prepared with seven (7) 3/32" holes drilled in the bottom. A mixture of 100 ml of 30 weight motor oil and 200 ml of tap water was poured through the apparatus. Clean water was observed to flow through the bottom of the cup with no noticeable oil in it. After weighing, it was found that the product of this invention had gained 104 grams and retained 100% of the oil while retaining only 2% of the water. C. Diesel oil was spilled onto wet pavement during a rainy windy day. The product of this invention was placed on the spill and was observed to absorb the oil while leaving the water in place.

The advantages flowing from usage of this type of product will be readily apparent to those familiar with the wide range of hydrocarbon spills which often happen in the presence of water. It has further advantages and savings with respect to disposal costs and labor required to remedy a hydrocarbon spill.

EXAMPLE IV

A hydrocarbon-specific absorbent was manufactured in the same manner as set forth in EXAMPLE III above, except: i) the Bersize No. 6991 sizing agent was not added to the slurry; and ii), an external sizing agent/surfactant manufactured by Bercen, Inc.—viz, Bersize No. 6482—was added in the turbulator at a rate of 0.5% by weight of dry solids. The product was tested for both floatation on water and oil absorption. Thus, the product produced in accordance with this example was placed in an open pan of water where it remained afloat for 48 hours. 30 weight motor oil was added to the water at the end of 48 hours and the product of this invention immediately absorbed the oil. In a second test, the product of this invention was observed to have an absorption ratio with 30 weight motor oil of 2.43 times its weight.

EXAMPLE V

A liquid absorbent material was manufactured in accordance with the methods described above in EXAMPLE I; but, in this instance, a super absorbent starch—viz., Solvintose N available from Avebe of Veendon, Holland—was added to the turbulator at a rate of 20% by weight of dry solids.

Further to the increased absorption capacity found, the starch served to provide a ready source of easily digestible material to promote the biodegradation of the absorbent and absorbed liquids. Those persons skilled in the art will readily recognize that this process could be applied to the hydrocarbon-specific product examples described above. The manufactured product was tested to have an absorption ratio with water of 4.2 times its weight. This comprised a 55% improvement in absorptive capacity, by weight, over the product of EXAMPLE I.

EXAMPLE VI

A liquid absorbent material was manufactured in accordance with the process set forth in EXAMPLE V above, except, a superabsorbent polymer (SAP) available from Merfin Industries of Delta, B.C., Canada, was substituted for the starch and added at a rate of 35% by dry weight. Such SAP products are commonly used in the diaper industry; and, persons skilled in the art will be able to find and use a wide range of similar products including some that are hydrocarbon-specific. The resultant product, when tested in water, rapidly expanded and absorbed 35 times its weight in water. The resulting saturated material was in a gelled state and difficult to handle as a solidified mass. However, the ratio of SAP to cellulose may be adjusted to a point which maximizes the absorption ratio and keeps the saturated end product in a manageable solidified form.

EXAMPLE VII

A liquid absorbent material was manufactured as described in EXAMPLE I above; but, in this instance, a bio-nutrient/enzyme—viz., OILEATER II from Oil Spill Eater International Corp. of Dallas, Tex.—was added to the product at a rate of 0.1% by weight in the turbulator. Persons skilled in the art relating to bio-remediation will recognize that there are a wide range of bio-enhancing products which can be added to a cellulose absorbent to enhance its biodegradability and the bio-remediation of liquids it may have absorbed.

One additional advantageous application for liquid absorbent materials embodying features of, and made in accordance with, the present invention comprises usage as a shock absorbent packing material for packaging containers—particularly containers of noxious and/or toxic chemicals and/or liquids. Thus, the absorbent media of the present invention is both suitable and highly effective as a replacement for conventional packing materials such as "vermiculite", an expanded silica material containing fibrous silica dust in the form of asbestos. Not only is the absorbent material effective for its shock absorbing properties, but, moreover, in those instances where the containers leak, the absorbent media of the present invention serves to effectively absorb and retain the leaking liquid, thereby preventing hazardous spills which might otherwise occur—all without any dust problem and particularly without distribution of hazardous asbestos dust.

Thus, those persons skilled in the art will appreciate that there have herein been disclosed improved processes for forming improved liquid absorbent media which may be either hydrophilic or hydrophobic, and which, in either case, are characterized by: i) generally rounded shot-like, soft, readily compressible particles having an open, porous fiber structure with a low bulk density preferably in the range of 15 to 18 lbs./ft.$^3$ and, in any event, less than 30 lbs./ft.$^3$; ii) preferably not more than 10% by weight inorganic solids or "fillers" and, in any case, less than 30% inorganic solids by weight; iii) shape and size gradations typical of clay-based floor sweeps and animal litters; iv) an absorptive capacity by weight up to 4 times greater than that of clay products and by volume up to twice that of products disclosed in Phillips U.S. Pat. Nos. 4,931,139 and 5,091,245; v) high retention rates for products absorbed; and vi), rapid absorption rates when compared with clay products and extruded tubular pellets.

Moreover, products made in accordance with the present invention are highly flammable both before and after absorption of liquid materials, which liquid materials are often non-flammable, and, therefore, products made in accordance with the present invention have high heat values for recycling as an energy source. Such products produce little ash when incinerated, thereby minimizing disposal costs and related problems; are readily biodegradable; and, readily permit addition of desired process chemicals to convert otherwise hydrophilic absorbent materials to hydrophobic absorbent materials as well as additives to enhance biodegradability of absorbent particulates.

In the claims:

1. A process for forming discrete, shot-like, absorbent pellets having a bulk density in the range of from about 13 lbs./ft.$^3$ to less than 30 lbs./ft$^3$ and minimal inorganic solids content wherein each of the pellets is characterized by: i) a smooth, soft, porous, compressible, generally rounded external configuration essentially devoid of projecting fiber ends; ii) a soft, open, porous compressible, internal fiber structure; and iii), an absorptive capacity in terms of percentage by volume in excess of about 53%, said process comprising the steps of:
    a) obtaining cellulose fiber materials having minimal inorganic solids content;
    b) rehydrating the cellulose fiber materials to produce a water/fiber slurry comprising on the order of about 96.5% water by weight and about 3.5% total solids by weight;
    c) de-watering the slurry to form a shreddable press cake containing total solids in the range of about 15% to about 50% by weight;
    d) shredding the press cake to form discrete particles each having a maximum dimension of not more than about ½";
    e) rolling the discrete shredded particles formed in Step (d) in an agglomerator so as to gather a plurality of discrete shredded particles into soft, discrete, shot-like, agglomerated, compressible pellets each having a smooth, soft, porous, compressible outer surface essentially devoid of projecting fiber ends and a soft, open, porous, compressible internal fiber structure; and,
    f) drying the pellets formed in Step (e) to remove excess water resulting in discrete shot-like pellets having a total dry solids content in excess of 75% by weight, a bulk density in the range of from about 13 lbs./ft.$^3$ to less than 30 lbs./ft.$^3$, and an absorptive capacity in terms of percentage by volume in excess of about 53%.

2. A process for forming discrete, shot-like absorbent pellets having a bulk density in the range of about 13 to about 18 lbs./ft.$^3$ and minimal inorganic solids content wherein each of the discrete pellets is characterized by:
    i) a smooth, soft, porous, compressible, generally rounded external configuration essentially devoid of projecting fiber ends; ii) a soft, open, porous, compressible, internal fiber structure; and iii), an absorptive capacity in terms of percentage by volume in excess of about 53% said process comprising the steps of:
    a) obtaining cellulose fiber materials having minimal inorganic solids content;
    b) rehydrating the cellulose fiber materials to produce a water/fiber slurry comprising on the order of about 96.5% water by weight and about 3.5% total solids by weight;
    c) de-watering the slurry to form a shreddable press cake containing approximately 25% total solids by weight;
    d) introducing the press cake into a first coarse shredding device such as one of a cake breaker and a cut-and-fold screw conveyor and reducing the press cake to particles smaller in size than about 4"×2"×½";
    e) introducing the particles formed in Step (d) into a second shredding device such as one of a high shear turbulator, a high shear blender and a high shear shredder and reducing the particle size to approximately ½" maximum size;

f) delivering the particles formed in Step (e) to one of a rotary pan agglomerator, a drum agglomerator and a rotary dryer; and, rolling such particles therein to gather a plurality of discrete shredded particles into pellets having: i) smooth, soft, porous, compressible, shot-like external configurations essentially devoid of projecting fiber ends; and ii), soft, open, porous, compressible, internal fiber structures; and, g) drying the shot-like pellets formed in Step (f) to remove excess water resulting in discrete, smooth, soft, compressible, shot-like, porous absorbent fiber pellets having a total solids content in the range of about 88% to about 95% dry solids by weight, a bulk density in the range of about 13 to about 18 lbs./ft.$^3$, and an absorptive capacity in terms of percentage by volume in excess of about 53%.

3. The discrete shot-like absorbent pellets prepared by the process of claims 1 or 2.

4. A process for forming discrete, shot-like, absorbent pellets as set forth in claims 1 or 2 wherein the pellets produced are of diverse sizes ranging up to about 6.2 mm and wherein at least about 90% of the pellets produced will pass through a 6.2 mm sieve while less than about 14% of the pellets produced will pass through a 1.2 mm sieve.

5. A process for forming discrete, shot-like, absorbent pellets as set forth in claim 4 wherein the sizes of the pellets produced closely approximate the size characteristics of conventional inorganic clay absorbents.

6. A process for forming discrete shot-like, absorbent pellets as set forth in claims 1 or 2 wherein a pH modifying material is added to the slurry formed in Step (b) in sufficient quantity to adjust the pH value of the slurry to a level in the range of 4.5 to 6.5.

7. A process for forming discrete shot-like, absorbent pellets as set forth in claim 6 wherein the pH modifying material is aluminum sulfate.

8. A process for forming discrete shot-like, absorbent pellets as set forth in claims 1 or 2 wherein a flocculent is added to the slurry formed in Step (b) prior to the de-watering step set forth in Step (c) in an amount sufficient to initiate flocculation of the materials in the slurry.

9. A process for forming discrete shot-like, absorbent pellets as set forth in claim 6 wherein a flocculent is added to the slurry formed in Step (b) prior to the de-watering step set forth in Step (c) in an amount sufficient to initiate flocculation of the materials in the slurry.

10. A process for forming discrete, shot-like, absorbent pellets as set forth in claims 1 or 2 wherein an internal size is added to the slurry prior to de-watering in Step (c) in sufficient quantity to render the absorbent pellets produced hydrophobic.

11. A process for forming discrete, shot-like, absorbent pellets as set forth in claim 6 wherein an internal size is added to the slurry prior to de-watering in Step (c) in sufficient quantity to render the absorbent pellets produced hydrophobic.

12. A process for forming discrete, shot-like, absorbent pellets as set forth in claim 8 wherein an internal size is added to the slurry prior to de-watering in Step (c) in sufficient quantity to render the absorbent pellets produced hydrophobic.

13. The discrete shot-like absorbent pellets formed by the process of claim 8.

14. A process for forming discrete, shot-like, absorbent pellets as set forth in claims 1 or 2 wherein a water soluble deodorizing agent is added to the product prior to shredding the product to form particles having a maximum dimension of approximately ½".

15. The discrete shot-like absorbent pellets formed by the process of claim 14 suitable for use as an animal bedding material.

16. A process for forming discrete, shot-like, absorbent pellets as set forth in claim 1 wherein during de-watering Step (c) sufficient excess water is removed from the press cake to reduce its total solids content to approximately 25% by weight.

17. A process of forming discrete shot-like, absorbent pellets as set forth in claim 1 wherein an absorption enhancing additive is added to the particles during Step (d) in an amount up to 50% dry solids by weight.

18. A process for forming discrete, shot-like, absorbent pellets as set forth in claim 17 wherein the absorption enhancing additive comprises a superabsorbent starch.

19. A process for forming discrete, shot-like, absorbent pellets as set forth in claim 17 wherein the absorption enhancing additive comprises a superabsorbent polymer.

20. A process for forming discrete, shot-like, absorbent pellets as set forth in claim 2 wherein an absorption enhancing additive is added to the particles during Step (e) in an amount up to 50% dry solids by weight.

21. A process for forming discrete, shot-like, absorbent pellets are set forth in claim 20 wherein the absorption enhancing additive comprises a superabsorbent starch.

22. A process for forming discrete, shot-like, absorbent pellets as set forth in claim 20 wherein the absorption enhancing additive comprises a superabsorbent polymer.

23. The discrete shot-like absorbent pellets formed by the process of claims 17, 18, 19, 20, 21 or 22.

24. A process for forming discrete, shot-like, absorbent pellets as set forth in claim 1 wherein an external size is added to the particles during Step (d) in sufficient quantity to render the absorbent pellets hydrophobic.

25. A process for forming discrete, shot-like, absorbent pellets as set forth in claim 2 wherein an external size is added to the particles during Step (e) in sufficient quantity to render the absorbent pellets hydrophobic.

26. The discrete shot-like absorbent pellets formed by the process of claims 24 or 25.

27. A process for forming discrete, ball-like, absorbent pellets as set forth in claim 10 wherein an external size is added to the particles during shredding thereof to form particles having a maximum dimension of approximately ½" so as to enhance the hydrophobic properties of the absorbent pellets.

28. A process for forming discrete, shot-like, absorbent pellets as set forth in claim 6 wherein an internal size is added to the slurry prior to de-watering in Step (c) in sufficient quantity to render the absorbent pellets produced hydrophobic and an external size is added to the particles during shredding thereof to form particles having a maximum dimension of approximately ½" so as to enhance the hydrophobic properties of the absorbent pellets.

29. A process for forming discrete, shot-like, absorbent pellets as set forth in claim 1 wherein at least one of an agglomerant enhancing material, a surfactant, an odor controlling material, an aromatic scent and an external size is added to the particles during Step (e).

30. A process for forming discrete, shot-like, absorbent pellets as set forth in claim 2 wherein at least one of an agglomerant enhancing material, a surfactant, an odor controlling material, an aromatic scent and an external size is added to the particles during Step (f).

31. A process for forming discrete, shot-like, absorbent pellets as set forth in claims 1 or 2 wherein the drying step is conducted at a temperature range of from about 170° C. to 240° C. for a period of approximately fifteen minutes.

32. A process for forming discrete, shot-like, absorbent pellets as set forth in claim 1 or 2 wherein a bio-nutrient/enzyme is added to the particles during shredding thereof to form particles having a maximum dimension of approximately $\frac{1}{2}''$.

* * * * *